US009823764B2

(12) United States Patent
Schwesinger et al.

(10) Patent No.: US 9,823,764 B2
(45) Date of Patent: Nov. 21, 2017

(54) POINTER PROJECTION FOR NATURAL USER INPUT

(71) Applicant: Microsoft Technology Licensing, LLC, Redmond, WA (US)

(72) Inventors: Mark Schwesinger, Bellevue, WA (US); Tommer Leyvand, Seattle, WA (US); Szymon Stachniak, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 99 days.

(21) Appl. No.: 14/559,870

(22) Filed: Dec. 3, 2014

(65) Prior Publication Data
US 2016/0162082 A1 Jun. 9, 2016

(51) Int. Cl.
*A63F 13/213* (2014.01)
*G06F 3/041* (2006.01)
(Continued)

(52) U.S. Cl.
CPC ......... *G06F 3/0412* (2013.01); *G02B 27/017* (2013.01); *G06F 3/005* (2013.01); *G06F 3/011* (2013.01); *G06F 3/012* (2013.01); *G06F 3/013* (2013.01); *G06F 3/017* (2013.01); *G06F 3/0304* (2013.01); *G06F 3/0488* (2013.01); *G06F 3/04815* (2013.01); *G06F 3/167* (2013.01);
(Continued)

(58) Field of Classification Search
CPC .......... G06F 3/005; G06F 3/011; G06F 3/012; G06F 3/013; G06F 3/0167; G06F 3/017; G06F 3/0304; G06F 3/04815
See application file for complete search history.

(56) References Cited

U.S. PATENT DOCUMENTS 7,400,322 B1* 7/2008 Urbach ..................... G09G 5/14
345/419
7,646,394 B1* 1/2010 Neely, III ............... G06F 3/011
345/419
(Continued)

FOREIGN PATENT DOCUMENTS

EP 1594040 A2 11/2005
WO 2012107892 A2 8/2012

OTHER PUBLICATIONS

Pierce, et al., "Image Plane Interaction Techniques in 3D Immersive Environments", In Proceedings of the Symposium on Interactive 3D Graphics, Apr. 30, 1997, 10 pages.
Slambekova, et al., "Gaze and Gesture Based Object Manipulation in Virtual Worlds", In Proceedings of the 18th ACM Symposium on Virtual Reality Software and Technology, Dec. 10, 2012, 1 page.
Slambekova, Dana, "Gaze and Gesture Based Object Interaction in Virtual World", In Master Thesis, Nov. 2011, 20 pages.
(Continued)

*Primary Examiner* — Michael J Eurice
(74) *Attorney, Agent, or Firm* — Alleman Hall Creasman & Tuttle LLP

(57) ABSTRACT

A method to identify a targeted object based on eye tracking and gesture recognition. The method is enacted in a compute system controlled by a user and operatively coupled to a machine vision system. In this method, the compute system receives, from the machine vision system, video imaging a head and pointer of the user. Based on the video, the compute system computes a geometric line of sight of the user, which is partly occluded by the pointer. Then, with reference to position data for one or more objects, the compute system identifies the targeted object, situated along the geometric line of sight.

20 Claims, 12 Drawing Sheets

(51) Int. Cl.

| | | |
|---|---|---|
| *G06F 3/01* | (2006.01) | |
| *G02B 27/01* | (2006.01) | |
| *G06F 3/00* | (2006.01) | |
| *G06F 3/0481* | (2013.01) | |
| *G06F 3/0488* | (2013.01) | |
| *G06F 3/16* | (2006.01) | |
| *H04N 13/02* | (2006.01) | |
| *G06F 3/03* | (2006.01) | |

(52) U.S. Cl.
CPC ............... *H04N 13/0271* (2013.01); *G02B 2027/0178* (2013.01); *G06F 2203/012* (2013.01); *G06F 2203/04101* (2013.01); *G06F 2203/04106* (2013.01); *G06F 2203/04808* (2013.01); *G06F 2206/20* (2013.01)

(56) References Cited

U.S. PATENT DOCUMENTS

| | | | |
|---|---|---|---|
| 8,514,221 B2 | 8/2013 | King et al. | |
| 8,581,901 B2 | 11/2013 | Joshi | |
| 8,707,174 B2 | 4/2014 | Hinckley et al. | |
| 8,788,947 B2 | 7/2014 | Putz et al. | |
| 2003/0218672 A1* | 11/2003 | Zhang | H04N 7/15 348/14.16 |
| 2006/0139314 A1* | 6/2006 | Bell | A63F 13/02 345/156 |
| 2010/0226535 A1* | 9/2010 | Kimchi | G06F 3/013 382/103 |
| 2011/0209057 A1* | 8/2011 | Hinckley | G06F 1/1641 715/702 |
| 2011/0209058 A1* | 8/2011 | Hinckley | G06F 3/04883 715/702 |
| 2011/0242102 A1* | 10/2011 | Hess | B60K 35/00 345/419 |
| 2012/0072853 A1* | 3/2012 | Krigstrom | G06F 3/0488 715/748 |
| 2012/0268410 A1* | 10/2012 | King | G06F 3/04883 345/173 |
| 2012/0324368 A1* | 12/2012 | Putz | G06F 3/0486 715/748 |
| 2013/0050432 A1* | 2/2013 | Perez | H04N 13/0278 348/47 |
| 2013/0093788 A1* | 4/2013 | Liu | G06F 3/011 345/633 |
| 2013/0120224 A1* | 5/2013 | Cajigas | G09G 5/00 345/8 |
| 2013/0127825 A1* | 5/2013 | Joshi | G06T 19/20 345/419 |
| 2013/0154913 A1* | 6/2013 | Genc | G06F 3/012 345/156 |
| 2013/0286004 A1* | 10/2013 | McCulloch | G06T 19/006 345/419 |
| 2013/0321271 A1* | 12/2013 | Bychkov | G06F 3/017 345/158 |
| 2014/0028548 A1* | 1/2014 | Bychkov | G06F 3/017 345/156 |
| 2014/0040820 A1* | 2/2014 | Ikeda | G06F 3/04883 715/800 |
| 2014/0184494 A1* | 7/2014 | Burachas | G06F 3/012 345/156 |
| 2014/0191927 A1* | 7/2014 | Cho | G02B 27/017 345/8 |
| 2015/0135144 A1* | 5/2015 | Kim | G06F 3/14 715/850 |
| 2015/0234569 A1* | 8/2015 | Hess | G06F 3/04815 345/156 |
| 2016/0299569 A1* | 10/2016 | Fisher | G02B 27/017 |

OTHER PUBLICATIONS

Kim, et al., "Real-Time Hand Gesture-Based Interaction with Objects in 3D Virtual Environments", In International Journal of Multimedia and Ubiquitous Engineering, vol. 8, No. 6, Number, 2013, 10 pages.

Vogel, et al., "Distant Freehand Pointing and Clicking on Very Large, High Resolution Displays", In Proceedings of the 18th annual Acm symposium on User interface software and technology, Oct. 23, 2005, 10 pages.

Kim, et al., "Interaction with Hand Gesture for a Back-Projection Wall", In Technical Report TUBS-CG-2003-11, Retrieved on: Sep. 8, 2014, 12 pages.

"Keynote for iOS 2.x (iPad): Resize, rotate, or flip an object", Retrieved on: Sep. 8, 2014 Available at: http://support.apple.com/kb/PH17801.

Fukumoto, M. et al., ""Finger-Pointer": Pointing Interface by Image Processing", In Computers & Graphics, vol. 18, Issue 5, Sep. 1994, Great Britain, 10 pages.

ISA European Patent Office, International Search Report and Written Opinion Issued in Application No. PCT/US2015/062050, dated Feb. 12, 2016, WIPO, 14 pages.

IPEA European Patent Office, Second Written Opinion Issued in Application No. PCT/US2015/062050, dated Oct. 12, 2016, WIPO, 9 Pages.

IPEA European Patent Office, International Preliminary Report on Patentability Issued in PCT Application No. PCT/US2015/062050, dated Feb. 9, 2017, WIPO, 10 Pages.

\* cited by examiner

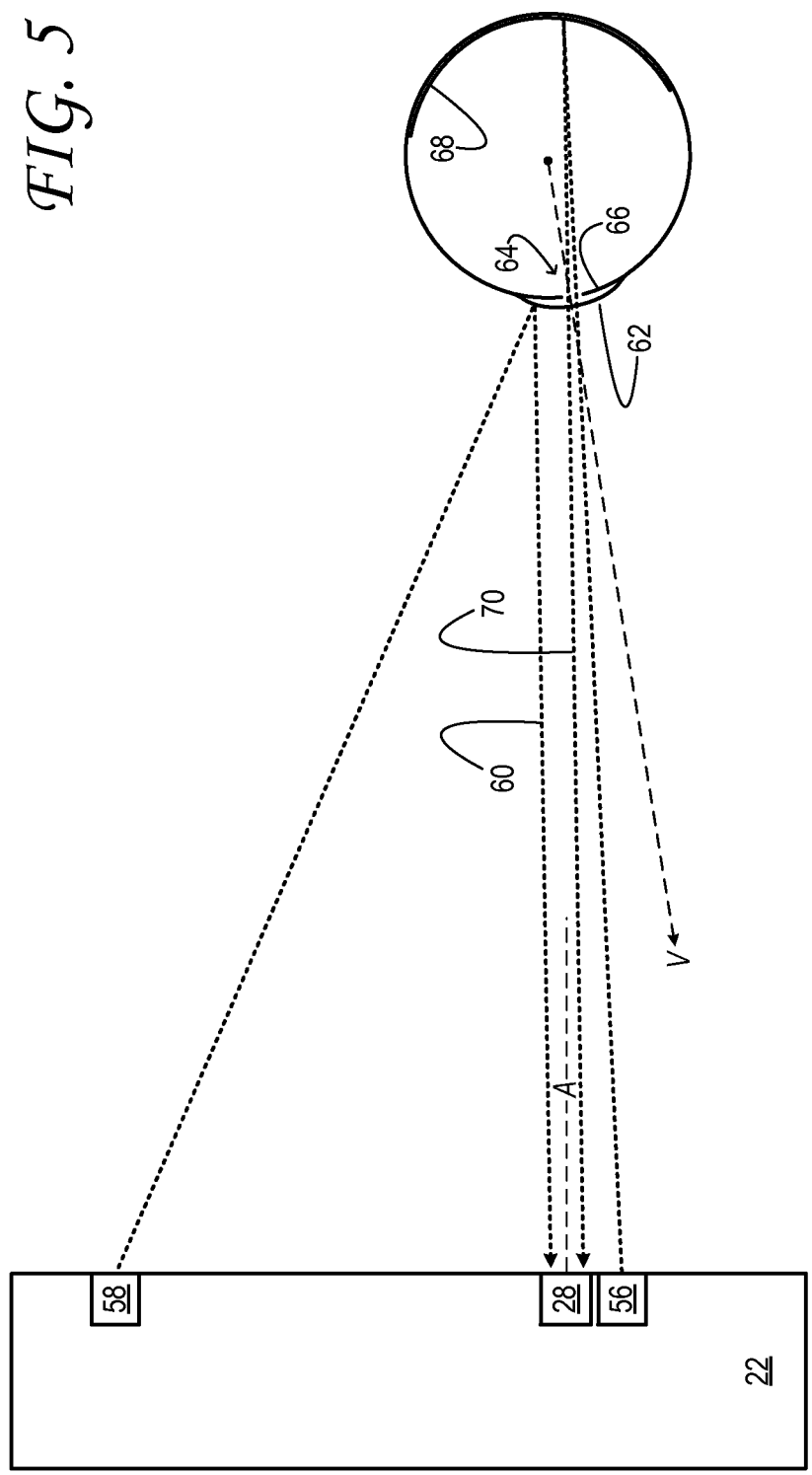

POINTER PROJECTION FOR NATURAL USER INPUT

BACKGROUND

Touch-screen technology combines display and input functionality in a unified, intuitive user interface (UI). Available in many sizes and form factors, and leveraging various sensor technologies, the touch screen has become a ubiquitous UI modality. Nevertheless, touch-screen technology has inherent limitations. For instance, while a touch-screen display may be viewable from a great distance, it can receive input only when the user is nearby. Furthermore, touch screens subject to normal use quickly become smudged by oils and other contaminants from the user's hands. Smudging degrades display quality and necessitates frequent cleaning.

SUMMARY

In an embodiment of this disclosure, a compute system receives, from a machine vision system, video imaging a head and pointer of a user. Based on the video, the compute system computes a geometric line of sight of the user through the pointer and identifies a targeted object, which is situated along the geometric line of sight.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in this disclosure.

BRIEF DESCRIPTION OF THE DRAWINGS

FIG. 5 shows aspects of eye tracking in one example embodiment.

DETAILED DESCRIPTION

Figure 1:
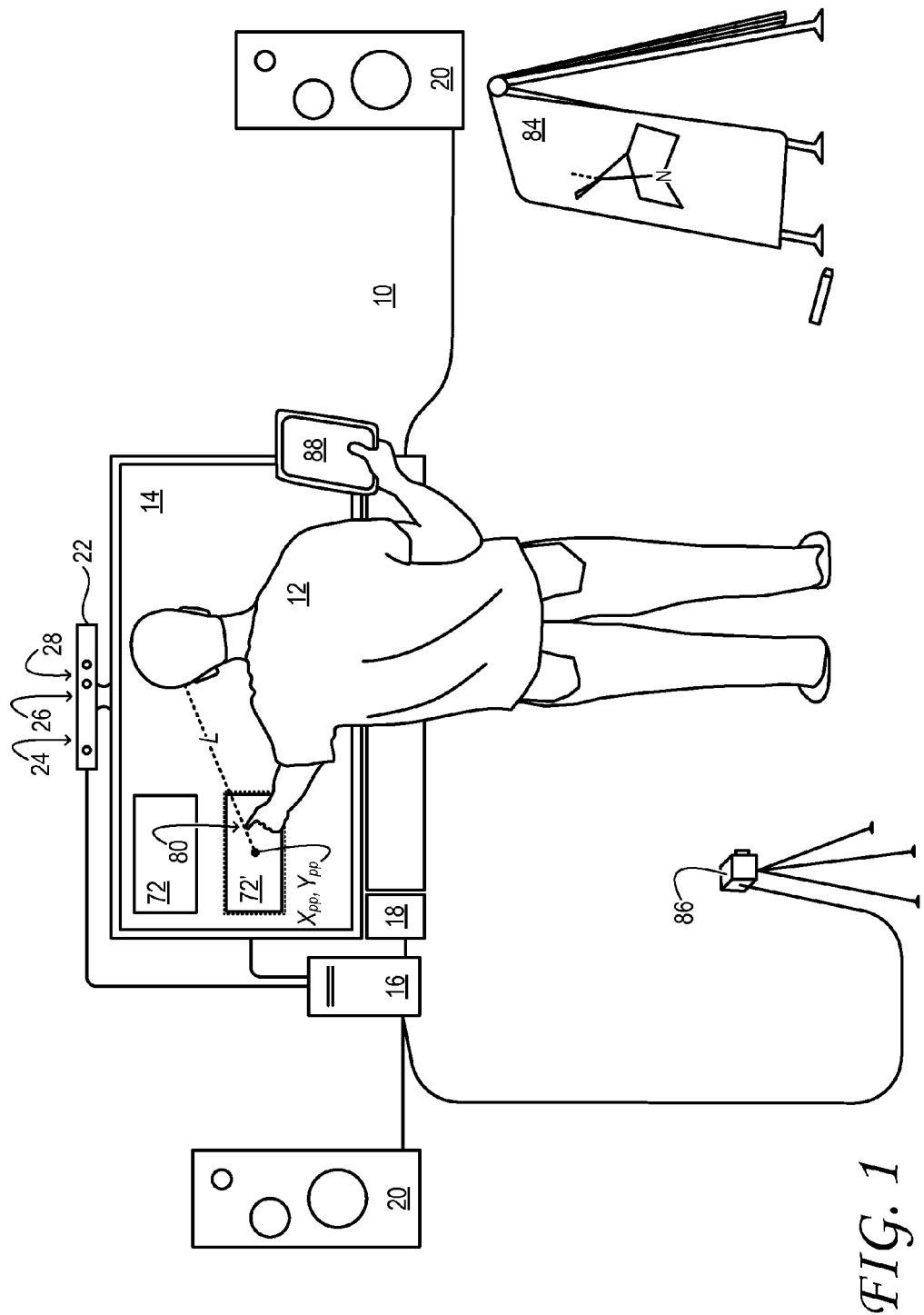
FIG. 1 shows an example environment in which objects are targeted by eye tracking combined with gesture recognition.

Components, process steps, and other elements that may be substantially the same in one or more embodiments are identified coordinately and are described with minimal repetition. It will be noted, however, that elements identified coordinately may also differ to some degree. It will be further noted that the drawing figures listed above are schematic and generally not drawn to scale. Rather, the various drawing scales, aspect ratios, and numbers of components shown in the figures may be purposely distorted to make certain features or relationships easier to see.

FIG. 1 shows an environment 10, where a user 12 is standing in front of large-format, flat screen display 14. Display 14 may be a stereoscopic 3D display in some embodiments, or a conventional 2D display in others. Compute system 16 is operatively coupled to the display and to other components, such as audio-video (A/V) receiver 18 and loudspeakers 20. In one embodiment, the compute system may be a game console. In another embodiment, the compute system may be a multipurpose personal computer or workstation. Additional aspects of the compute system are described hereinafter.

In some embodiments, user 12 may interact with compute system 16 and associated components via conventional input devices—a keyboard, touch-screen, mouse, game-system controller, and/or wireless remote, for example. Alternatively, or in addition, the compute system may respond to 'natural user input' (NUI), where the user's speech, hand gestures, and/or eye movements are sensed, interpreted, and used to control the compute system.

To this end, compute system 16 in FIG. 1 is operatively coupled to machine vision system 22. The illustrated machine vision system includes an infrared (IR) or near IR (NIR) illumination source 24, a depth camera 26, and a flat-image camera 28. The machine vision system may also include a microphone 30 (not shown in FIG. 1) for receiving speech or other audible input from user 12.

Depth camera 26 may be configured to acquire a time-resolved sequence of depth maps of user 12 and other aspects of environment 10. As used herein, the term 'depth map' refers to an array of pixels registered to corresponding regions $(X_i, Y_i)$ of an imaged scene, with a depth value $Z_i$ indicating, for each pixel, the depth of the corresponding region. 'Depth' is defined as a coordinate parallel to the optical axis of the depth camera, which increases with increasing distance from the depth camera. Operationally, a depth camera may be configured to acquire 2D image data, from which a depth map is obtained via downstream processing.

In general, the nature of depth camera 26 may differ in the various embodiments of this disclosure. In one embodiment, brightness or color data from two, stereoscopically oriented imaging arrays in the depth camera may be co-registered and used to construct a depth map. In other embodiments, illumination source 24 may be configured to project onto the subject a structured illumination pattern comprising numerous discrete features—e.g., lines or dots. An imaging array in the depth camera may be configured to image the structured illumination reflected back from the subject. Based on the spacings between adjacent features in the various regions of the imaged subject, a depth map of the subject may be constructed. In still other embodiments, the illumination source may project pulsed IR or NIR illumination towards the subject. A pair of imaging arrays in the depth camera may be configured to detect the pulsed illumination reflected back from the subject. Both arrays may include an electronic shutter synchronized to the pulsed illumination, but the integration times for the arrays may differ, such that a pixel-resolved time-of-flight of the pulsed illumination, from the illumination source to the subject and then to the arrays, is discernible based on the relative amounts of light received in corresponding elements of the two arrays.

Through a suitable objective-lens system, flat-image camera 28 detects light over a range of field angles, mapping such angles to corresponding pixels of a rectangular pixel array. In one embodiment, the flat-image camera may detect the light in a plurality of wavelength channels—e.g., red, green, blue, etc.—each associated with a subset of the pixels of the array. Alternatively, a monochromatic flat-image camera may be used, which images visible, IR, NIR, and/or ultraviolet (UV) light in grayscale. Color or brightness values for all of the pixels exposed in the flat-image camera constitute collectively a digital image. In some embodiments, depth camera 26 and flat-image camera 28 are arranged with parallel optical axes oriented in the same direction.

Figure 2:
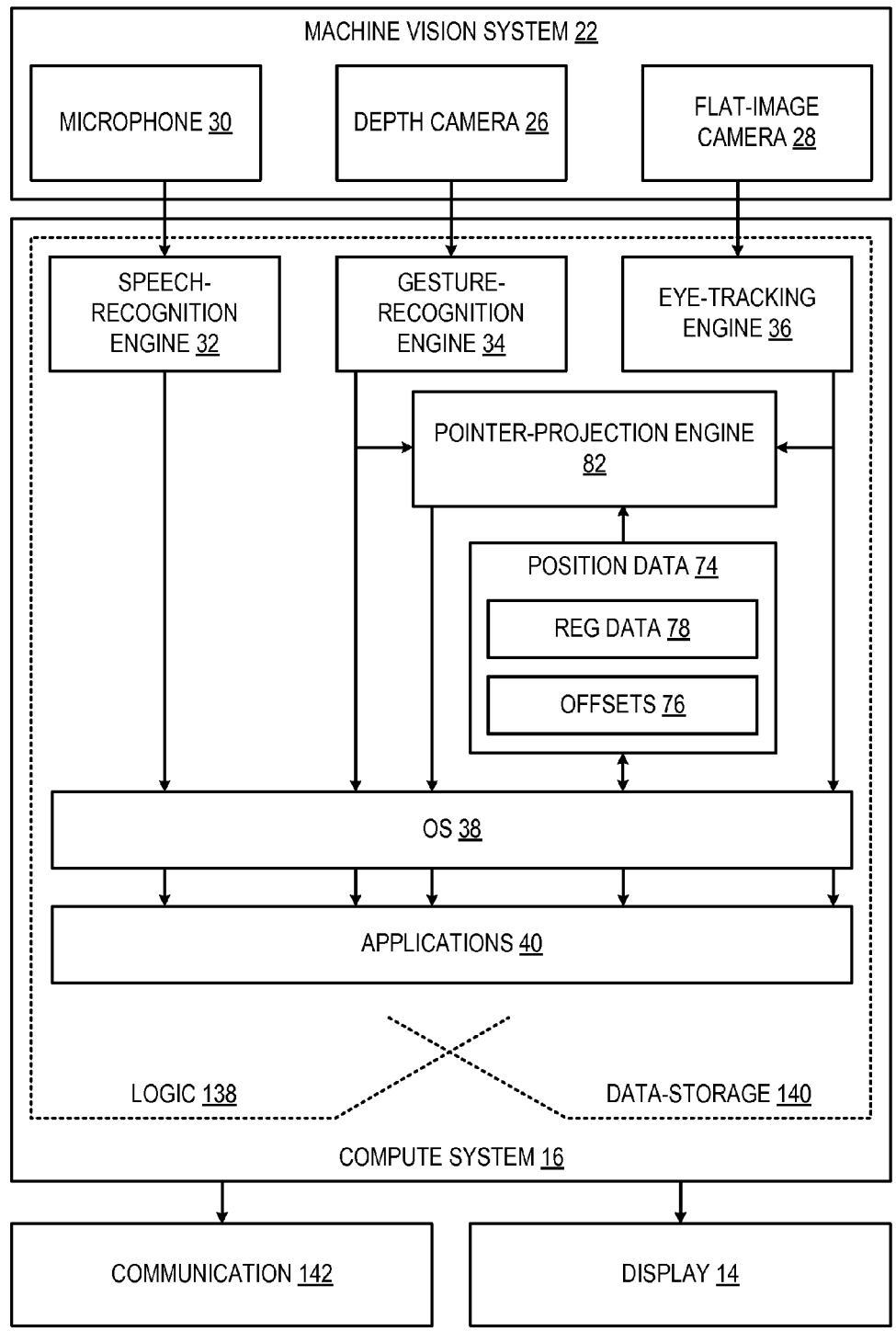
FIG. 2 shows aspects of an example compute system configured to support object targeting.

As shown in FIG. 2, sensory data from machine vision system 22 is processed by one or more NUI engines of compute system 16 to reveal actionable user input. Such input is parsed by operating system (OS) 38 or by application-level code, thereby controlling the operation of the compute system. In the embodiment of FIG. 2, compute system 16 includes a speech-recognition engine 32, a gesture-recognition engine 34, and an eye-tracking engine 36.

Speech-recognition engine 32 is configured to process audio data from microphone 30, to recognize certain words or phrases in the user's speech, and to generate corresponding actionable input to OS 38 or applications 40. Gesture-recognition engine 34 is configured to receive at least the depth video from machine-vision system 22 via a wired or wireless hardware interface. The gesture-recognition engine is further configured to process at least the depth video (i.e., a time-resolved sequence of depth maps) from machine-machine vision system 22, to identify one or more human subjects in the depth video, to compute various geometric (e.g., skeletal) features of the subjects identified, and to gather from the geometric features various postural or gestural information to be used as NUI.

In one non-limiting embodiment, gesture-recognition engine 34 identifies at least a portion of one or more human subjects in the depth video. Through appropriate depth-image processing, a given locus of a depth map may be recognized as belonging to a human subject. In a more particular embodiment, pixels that belong to a human subject may be identified (e.g., by sectioning off a portion of a depth map that exhibits above-threshold motion over a suitable time scale) and a generalized geometric model of a human being may be derived from those pixels.

In one embodiment, each pixel of a depth map may be assigned a person index that identifies the pixel as belonging to a particular human subject or non-human element. As an example, pixels corresponding to a first human subject can be assigned a person index equal to one, pixels corresponding to a second human subject can be assigned a person index equal to two, and pixels that do not correspond to a human subject can be assigned a person index equal to zero. Person indices may be determined, assigned, and saved in any suitable manner.

Gesture-recognition engine 34 also may make the determination as to which human subject (or subjects) will provide user input to compute system 16—i.e., which will be identified as the user. In some embodiments, a human subject may be selected as the user based on proximity to display 14 or depth camera 26, and/or position in a field of view of the depth camera. More specifically, the user selected may be the human subject closest to the depth camera or nearest the center of the field of view of the depth camera.

Gesture-recognition engine 34 also may process posture information from the user. The posture information is derived computationally from the depth video. In some embodiments, additional sensory input—e.g., image data from a flat-image camera 28 or audio data from microphone 30—may be processed along with the posture information.

In some embodiments, gesture-recognition engine 34 may be configured to analyze the pixels of a depth map that correspond to the user, in order to determine what part of the user's body each pixel corresponds to. A variety of different body-part assignment techniques can be used to this end. In one example, each pixel of the depth map with an appropriate person index (vide supra) may be assigned a body-part index. The body-part index may include a discrete identifier, confidence value, and/or body-part probability distribution indicating the body part or parts to which that pixel is likely to correspond.

In some embodiments, machine-learning may be used to assign each pixel a body-part index and/or body-part probability distribution. The machine-learning approach analyzes a user with reference to information learned from a previously trained collection of known poses. During a supervised training phase, for example, a variety of human subjects may be observed in a variety of poses; trainers provide ground truth annotations labeling various machine-learning classifiers in the observed data. The observed data and annotations are then used to generate one or more machine-learned algorithms that map inputs (e.g., depth video) to desired outputs (e.g., body-part indices for relevant pixels).

Figure 3:
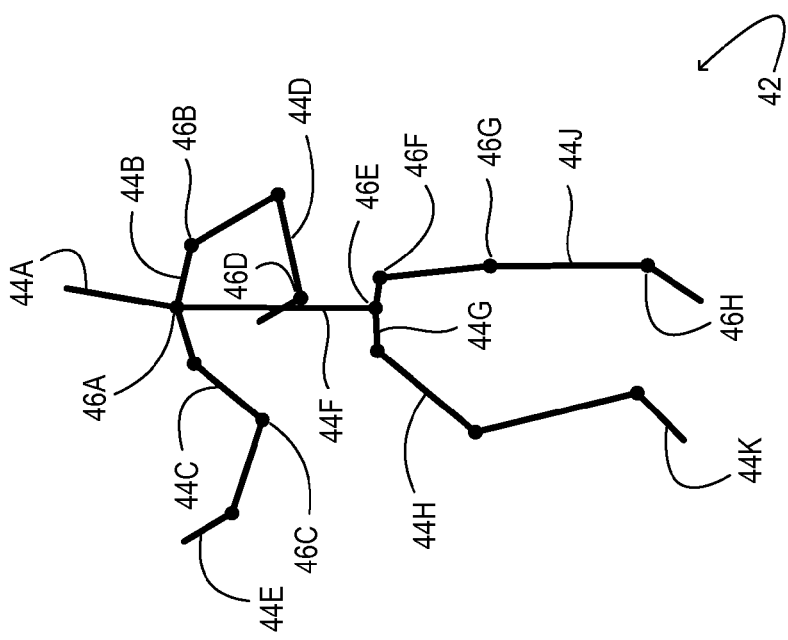
FIG. 3 shows aspects of an example virtual skeleton used in gesture recognition.

Thereafter, a virtual skeleton is fit to the pixels of depth video that correspond to the user. FIG. 3 shows an example virtual skeleton 42. The virtual skeleton includes a plurality of skeletal segments 44 pivotally coupled at a plurality of joints 46. In some embodiments, a body-part designation may be assigned to each skeletal segment and/or each joint. In FIG. 3, the body-part designation of each skeletal segment 44 is represented by an appended letter: A for the head, B for the clavicle, C for the upper arm, D for the forearm, E for the hand, F for the torso, G for the pelvis, H for the thigh, J for the lower leg, and K for the foot. Likewise, a body-part designation of each joint 46 is represented by an appended letter: A for the neck, B for the shoulder, C for the elbow, D for the wrist, E for the lower back, F for the hip, G for the knee, and H for the ankle. Naturally, the arrangement of skeletal segments and joints shown in FIG. 3 is in no way limiting. A virtual skeleton consistent with this disclosure may include virtually any type and number of skeletal segments and joints.

Figure 4:
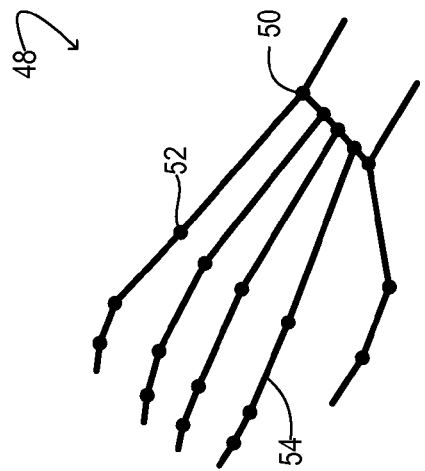
FIG. 4 shows aspects of a hand portion of an example virtual skeleton.

In a more particular embodiment, point clouds (portions of a depth map) corresponding to the user's hands may be further processed to reveal the skeletal substructure of the hands. FIG. 4 shows an example hand portion 48 of a user's virtual skeleton 42. The hand portion includes wrist joints 50, finger joints 52 and adjoining finger segments 54.

Via any suitable minimization approach, the lengths of the skeletal segments and the positions and rotational angles of the joints may be adjusted for agreement with the various contours of a depth map. In this way, each joint is assigned various parameters—e.g., Cartesian coordinates specifying joint position, angles specifying joint rotation, and additional parameters specifying a conformation of the corresponding body part (hand open, hand closed, etc.). The virtual skeleton may take the form of a data structure including any, some, or all of these parameters for each joint. This process may define the location and posture of the imaged human subject. Some skeletal-fitting algorithms may use the depth data in combination with other information, such as color-image data and/or kinetic data indicating how one locus of pixels moves with respect to another. In the manner described above, a virtual skeleton may be fit to each of a sequence of frames of depth video. By analyzing positional change in the various skeletal joints and/or segments, the corresponding movements—e.g., gestures or actions of the imaged user—may be determined.

The foregoing description should not be construed to limit the range of approaches usable to construct a virtual skeleton 42, for a virtual skeleton may be derived from a depth map in any suitable manner without departing from the scope of this disclosure. Moreover, despite the advantages of using a virtual skeleton to model user 12, even this aspect is by no means necessary. In lieu of a virtual skeleton, raw point-cloud data may be used directly to provide suitable posture information.

Continuing in FIG. 2, eye-tracking engine 36 is configured to receive at least video from flat-image camera 28 via a wired or wireless hardware interface. The eye-tracking engine is further configured to process image data from flat-image camera 28 to locate one or more ocular features of user 12. Such features may include the pupils, or one or more glints reflected from the corneas. Based on the size and location of the ocular features in the image data, the eye-tracking engine computes the center point of each pupil in real-world, 3D coordinates, and optionally, the gaze vector V from each eye. In examples where the gaze vector is determined for both the right and left eyes concurrently, the point of intersection of the right and left gaze vectors may be used to define the user's focal point in three dimensions.

FIG. 5 illustrates additional aspects of eye tracking in one example embodiment. In the illustrated example, the illumination source of machine vision system 22 includes an on-axis lamp 56 and an off-axis lamp 58. Each lamp may comprise a light-emitting diode (LED) or diode laser, for example, which emits IR or NIR illumination in a high-sensitivity wavelength band of flat-image camera 28. In some embodiments, the flat-image camera may include a wavelength filter blocking transmission outside of the emission band of the illumination source, to improve bright-pupil contrast in the presence of strong ambient light.

The terms 'on-axis' and 'off-axis' refer to the direction of illumination of the eye with respect to the optical axis A of flat-image camera 28. On- and off-axis illumination may serve different purposes with respect to eye tracking. As shown in FIG. 5, off-axis illumination may create a specular glint 60 that reflects from the cornea 62 of the user's eye. Off-axis illumination may also be used to illuminate the eye for a 'dark pupil' effect, where pupil 64 appears darker than the surrounding iris 66. By contrast, on-axis illumination from an IR or NIR source may be used to create a 'bright pupil' effect, where the pupil appears brighter than the surrounding iris. More specifically, IR or NIR illumination from on-axis lamp 56 may illuminate the retroreflective tissue of the retina 68 of the eye, which reflects the illumination back through the pupil, forming a bright image 70 of the pupil, as imaged by flat-image camera 28. Although FIG. 5 shows the on- and off-axis lamps schematically as point sources, it will be understood that these lamps may take any suitable form. For example, in some examples, on-axis lamp 56 may be configured in the form of an 'LED ring' surrounding the aperture of flat-image camera 28.

Returning now to FIGS. 1 and 2, various graphical display objects 72 may be presented on display 14. Such objects may include windows, photos, text boxes, icons, and UI control elements, for example. The coordinates of each object on the display are stored (referring to FIG. 2) in position data 74, which is accessible to OS 38. The position data may include X, Y offsets 76 of opposite corners of each object relative to a given corner of the viewable area of the display. In embodiments where display 14 is a stereoscopic or 3D display, a depth offset Z may also be specified. Position data 74 also includes registration data 78 for display 14. The registration data may include coordinates defining the physical size, position, and orientation of the viewable area of the display—e.g., X, Y, and Z for each corner of the active display area.

In the scenario illustrated in FIG. 1, user 12 is gazing in the direction of a particular targeted object 72'. The targeted object may be an object that the user intends to move, resize, select, or activate, for example. Based on gaze vector V from eye-tracking engine 36, and with reference to registration data 78, the target coordinates of the user's gaze on display 14 may be estimated. Under some conditions, the estimate may be accurate enough to reveal, with further reference to offsets 76, which of the various objects has been targeted. Whether or not this is possible depends on the accuracy of eye-tracking engine 36, and on other factors, such as the size and layout of the objects on the display, and the whereabouts of the user relative to the display. Described below is a more robust mode of targeting an object using an intuitive pointer gesture combined with gaze. In this approach, compute system 16 is able to accurately distinguish between closely spaced objects to determine which has been targeted, even when the user is situated relatively far from the display.

A 'pointer', in the context of this disclosure, may be a finger or hand of the user. It may also be a wand or stylus, a combination of fingers, a portion of a glove, or any other suitable object. In the example of FIG. 1, pointer 80 is one of the user's fingers. The user, while gazing at targeted object 72', positions the pointer to partly occlude the targeted object (from the user's own perspective). In other variants, the user may position the pointer directly adjacent the targeted object—e.g., in a location where the pointer appears to touch the targeted object.

Referring again to FIG. 2, pointer-projection engine 82 receives gesture information from gesture-recognition engine 34, which includes the 3D coordinates of pointer 80. The pointer-projection engine also receives pupil-position data from eye-tracking engine 36. The pointer-projection engine is configured, in effect, to construct a straight line of sight L passing between the pupil and the tip of the pointer. This line is used to identify a targeted object on display 14. With reference to registration data 78, the pointer-projection engine locates the point where L intersects the viewable plane of display 14. The point of intersection is used to compute pointer-projection coordinates ($X_{pp}$, $Y_{pp}$) relative to a corner of the display, which is furnished to OS 38. There, the offset 76 of each object on the display is compared to the pointer-projection coordinates, to determine which object has been targeted.

While both pointer-projection and stand-alone gaze tracking define a line of sight in terms of two measured points, each point subject to measurement error, pointer-projection targets more robustly than stand-alone gaze tracking. In gaze tracking, the measured points are (a) the center of the eye and (b) the center of the pupil. These points are separated by little more than a centimeter. In the pointer-projection approach, the measured points are (a) the center of the pupil and (b) the tip of the pointer, which may be separated by approximately ten or twenty centimeters. When an object is targeted, the line of sight defined by the measured points is extrapolated all the way to the display screen, which could be meters away from the user. The uncertainty in the target coordinates is proportional to the extrapolated distance, and inversely proportional to the distance between the measured points. Accordingly, pointer-projection may reduce the targeting errors of gaze tracking by a factor of ten or more, assuming the measurement errors are similar for the two methods.

As a consequence of reduced distance of extrapolation, it may be acceptable, in some scenarios, to tolerate relatively large uncertainties in pupil and/or pointer position. Accordingly, virtual skeletons 42 with fully resolved hand portions may not be needed in every embodiment. Rather, the pointer position may be determined based on a single hand-joint position of the virtual skeleton, along with an indication from gesture-recognition engine 34 as to whether the hand is open or closed. Likewise, eye-tracking engine 36 need not resolve the pupil in every embodiment, but may, in some examples, place the pupil at the center of the eye by way of approximation. In yet another embodiment, pupil position may be estimated based solely on the head-joint position from the virtual skeleton. Accordingly, the term 'eye tracking', as used herein, includes methods based on crude approximations of pupil position as well as precise imaging of the pupil as described above.

Once an object is targeted, user 12 may signal further action to be taken on the object. One or more of the NUI engines of compute system 16 may be configured to detect the user's intent to act on the targeted object. For example, after an object is targeted, the user may signal an intent to select the object—e.g., by hovering pointer 80 in front of the object, or by moving the pointer to encircle the object. Gesture-recognition engine 34 may be configured to detect the selection gesture.

Figure 6:
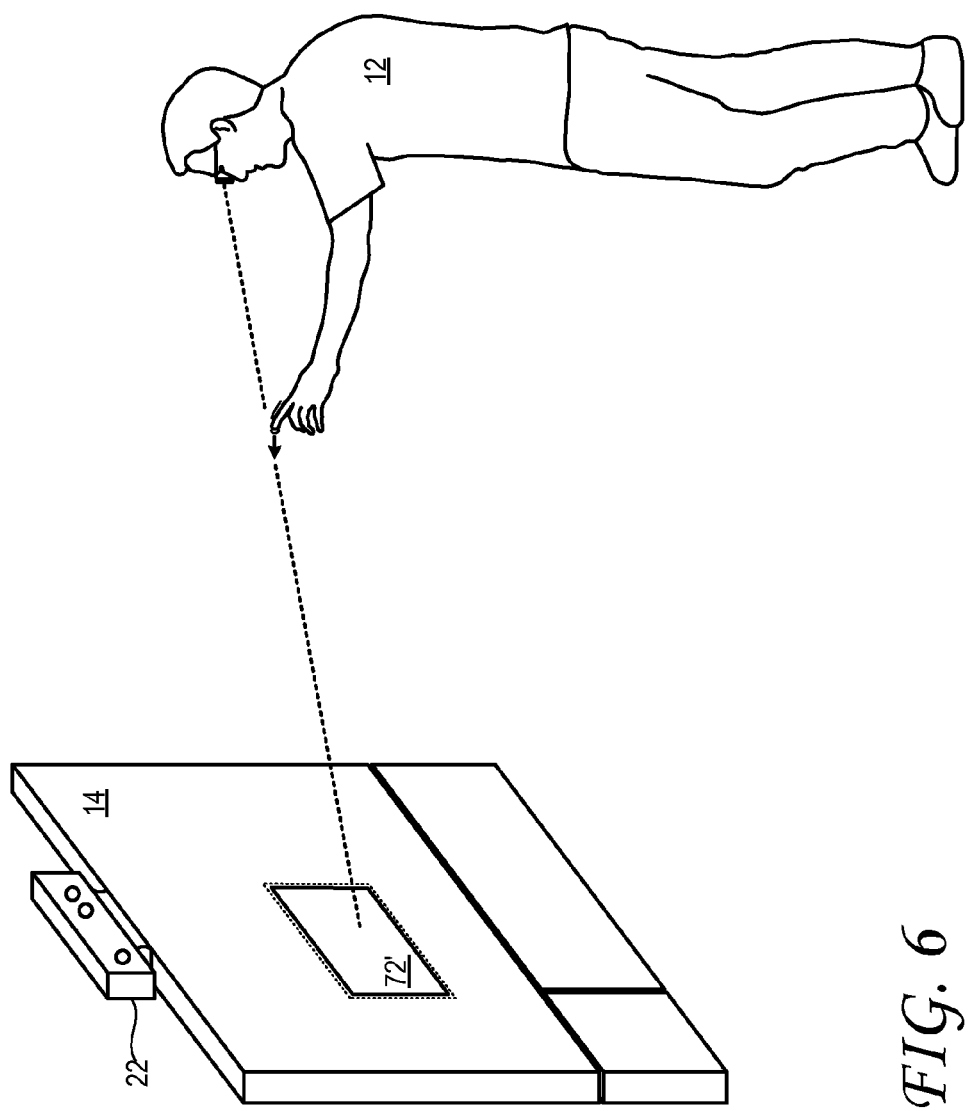
FIG. 6 shows a user making a gesture to select a targeted object.

In some embodiments and scenarios, the targeted object, optionally after selection by the user, may be activated. Activation may include execution of OS- or application-level code associated with the targeted object. For example, if the targeted object is a document, activation may include launching a word-processor which automatically opens the document for editing. If the targeted object is a slideshow, activation may include presenting the slideshow on the display. The user may signal an intent to activate the object by making an incremental forward movement of the pointer—e.g., a push gesture. A push gesture is illustrated by example in FIG. 6. Gesture-recognition engine 34 may be configured to detect this type of activation gesture. In other examples, the user's intent to select or activate a targeted object may be signaled by a spoken word or phrase detected by speech-recognition engine 32.

In some cases, the user may want to move a targeted (optionally selected) object to a different position on display 14. The user may signal this intent by maintaining gaze on the targeted object while moving the pointer up, down, or to the side. Pointer-projection engine 82 recognizes the change in pointer coordinates $X_{pp}$, $Y_{pp}$ and directs the OS to move the targeted object to the changed coordinates.

By enabling the user to intuitively target, select, activate, and move objects on display 14, compute system 16 endows the display with touch-screen-like features, while overcoming some of the disadvantages of conventional touch-screen technology. For instance, the user is able to manipulate the objects without smudging the display, and may do so even when the display is out of reach.

Figure 7:
FIGS. 7, 8, and 9 show a group of display objects including a targeted object.
Figure 8:
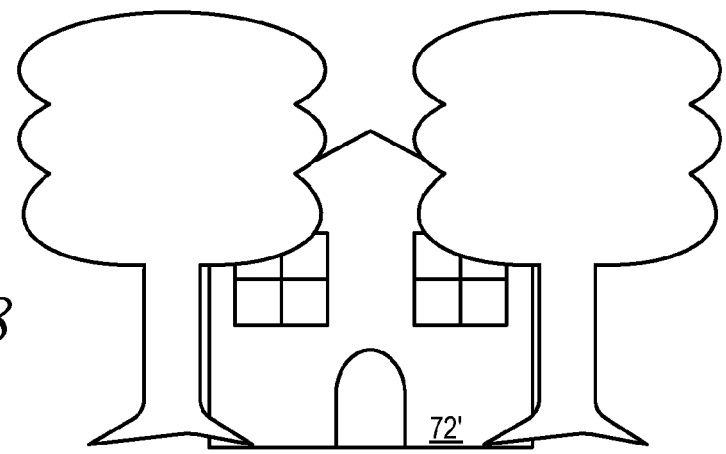
Figure 10:
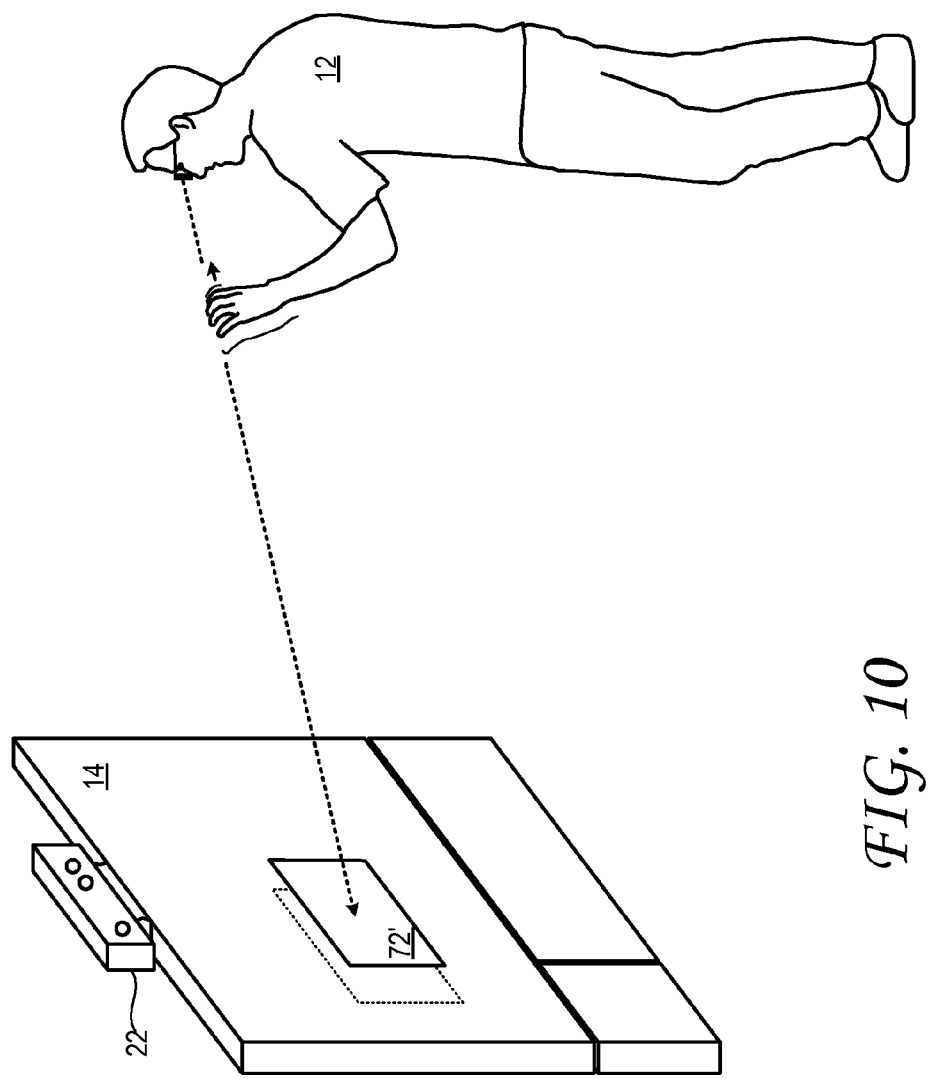
FIG. 10 shows a user making a gesture to move a targeted object forward.

In some embodiments, the objects presented on display 14 may be three-dimensional, or at least registered to a 3D space. The 3D space may have a finely resolved depth coordinate Z, or just a few layers stacked parallel to each other. Accordingly, user 12 may want to move a targeted or selected object to a different depth coordinate or layer. This scenario is illustrated in FIGS. 7 and 8, where targeted object 72' in FIG. 7 has been moved forward in FIG. 8. The user may signal an intent to change the depth of a targeted object by maintaining gaze on the object while moving the pointer away from or closer to his face. Pointer motion toward the face, as shown in FIG. 10, may signal the intent to reduce the depth of the object, while pointer motion away from the face may signal the intent to increase the depth. Pointer-projection engine 82 recognizes the maintained pointer coordinates, while gesture-recognition engine 34 recognizes the direction and extent of pointer motion. Combined instruction from these engines directs the system to move the object to a new depth value. Depending on the camera model used for 3D rendering, depth change of a display object may also effect a zoom-in/zoom-out feature.

Figure 9:
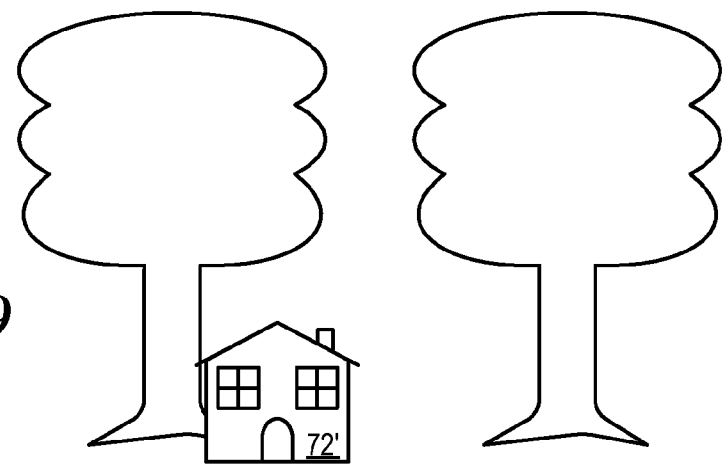
Figure 11:
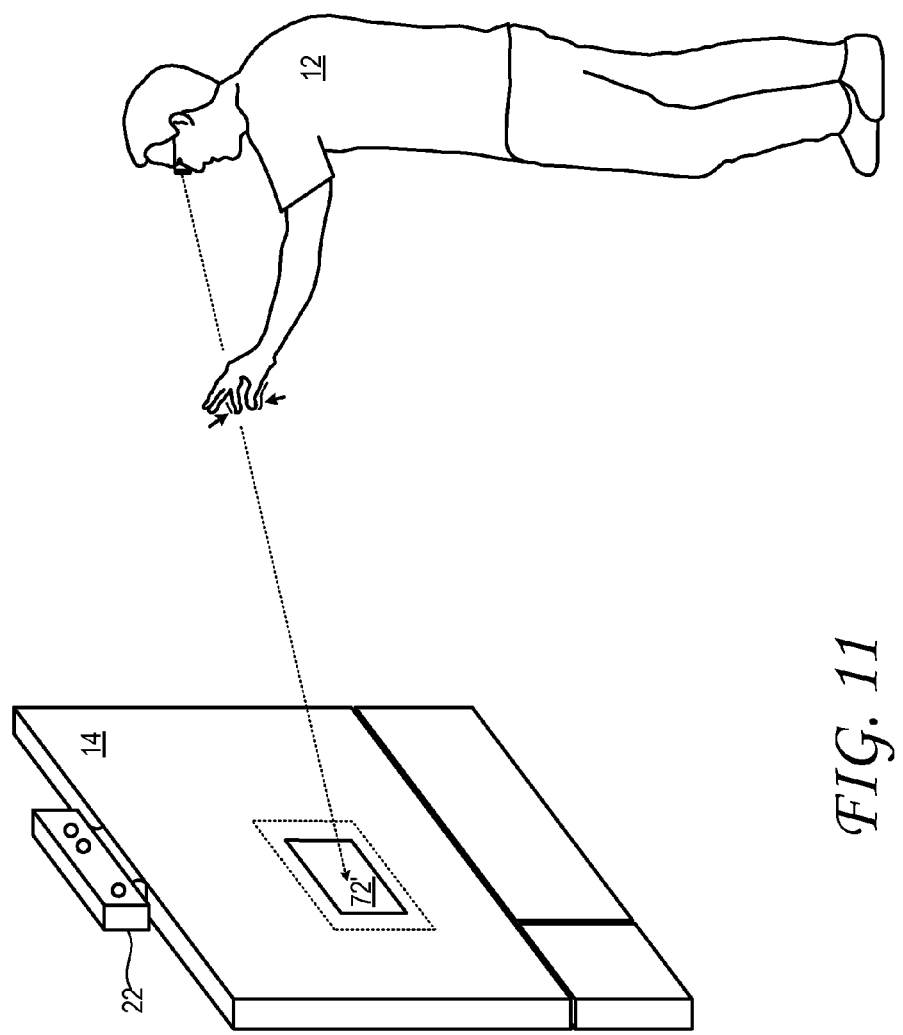
FIG. 11 shows a user making a gesture to reduce the size of a targeted object.

In some cases, the user may want to resize a targeted or selected object. This scenario is illustrated in FIGS. 7 and 9, where targeted object 72' in FIG. 7 has been reduced in size in FIG. 9. The user may signal an intent to resize a targeted object by maintaining gaze on the object while changing the extent of opening of the pointer. A typical pointer for this example is the combination of the thumb and forefinger of the user. Alternatively, the pointer may consist of the user's entire hand. Decreased separation between the thumb and forefinger, as shown in FIG. 11, or closure of the hand, may signal a reduction in the size of the object, while increased separation or opening of the hand may signal enlargement. Pointer-projection engine 82 recognizes the maintained pointer coordinates, while gesture-recognition engine 34 recognizes opening or closure of the pointer. Combined instruction from these engines directs OS 38 to resize the object. The reader will note that the gesture used to move the targeted object forward or back is perfectly distinct from the gesture used to resize the object, in contrast to UI modalities in which an overloaded gesture is used for both operations.

As noted above, pointer-projection engine 82 accesses registration data 78 in order to compute pointer-projection coordinates $X_{pp}$, $Y_{pp}$. The process of supplying the registration data is referred to herein as 'registration' of display 14. Registration may be enacted via any suitable form of user input; it must be repeated every time display 14 and machine vision system 22 are moved relative to each other.

It is convenient in some embodiments to leverage the functionality of pointer-projection engine 82 and upstream componentry to enact registration of display 14. In one example, a user setting up environment 10 may be requested to target each corner of the viewable area of display 14 in succession, through combined gaze and pointer position, in the manner described above. Targeting each corner from one pupil position does not uniquely determine the corner coordinates, but defines for each corner a line passing through that corner. The user then may be requested to move to a different position and repeat the process. This will define for each corner of the display a second line on which that corner is located. The intersection of each pair of corresponding lines defines the corner position uniquely. The skilled reader will appreciate that numerous variants on this registration approach are possible, and are contemplated herein.

In some embodiments, a plurality of displays 14 may be operatively coupled to compute system 16. Accordingly, the operation of pointer-projection engine 82 may be extended to compute pointer-projection coordinates $X_{pp}^i$, $Y_{pp}^i$ for each display i that intersects line of sight L. OS 38 may be configured to use the pointer-projection coordinates to identify targeted objects on each of the displays. This requires the size, location, and orientation of each display to be included in position data 74, along with the offset of every object displayed thereon.

In cases where a plurality of displays 14 are operatively coupled to compute system 16, user 12 may want to move or copy an object from one display to another. This action may be signaled as described above, with the line of sight moving across and off a viewable area of a first display, passing between the displays, then onto and across the viewable area of a second display to the desired final coordinates.

The approach outlined above for handling a plurality of operatively coupled displays 14 is readily extended to scenarios involving a plurality of different compute systems 16, each having one or more displays. Provided that the compute systems are communicatively coupled to each other, position data detailing the size, location, and orientation of each display and the arrangement of display objects can be shared with pointer-projection engine 82, for cross-system operation.

In the foregoing description, the term 'object' is used mainly to refer to display objects—constructs of a compute system presented on an associated display. However, this disclosure is also consistent with a broader use of the term. In particular, pointer-projection engine 82 can be used to identify any targeted, real-world object in environment 10. Targeted objects may include remotely controllable devices like a cable box, A/V receiver, printer, or environmental control. The act of targeting and selecting such objects through pointer-projection engine 82 may have the effect of presenting a control interface of that device on display 14, enabling the user to control the device through NUI.

In other examples, objects may include photographs, sticky notes, or figures drawn on paper or on a whiteboard, for example. Compute system 16 may be configured to respond in a particular way when such an object is targeted, selected, and/or activated. In the scenario shown in FIG. 1, for example, environment 10 includes a large drawing pad 84. Targeting and/or activation of the drawing pad may trigger the drawing pad to be photographed via an auxiliary camera 86, and its image inserted into a document open on compute system 16. In other examples, targeting and/or activation of the drawing pad may cause data for the drawn structure to be retrieved.

The targeting of any real-world object requires registration of that object, which may occur as outlined above in the context of display registration. In other embodiments, a real-world object or display may be self-registering. Self-registering objects may include devices with built-in location and orientation tracking (via GPS and/or inertial sensors), and objects physically coupled to wireless location finders. The location and orientation of these objects within environment 10 may be computed locally and communicated to compute system 16, to effect registration. A further advantage of this feature is that self-registering objects stay registered even when moved within the environment. Thus, in the scenario shown in FIG. 1, where the user is holding a tablet computer 88 in one hand while gesturing to compute system 16 with the other, a targeted display object can be moved, via pointer-projection engine 82, between display 14 and the display screen of the tablet.

Figure 12:
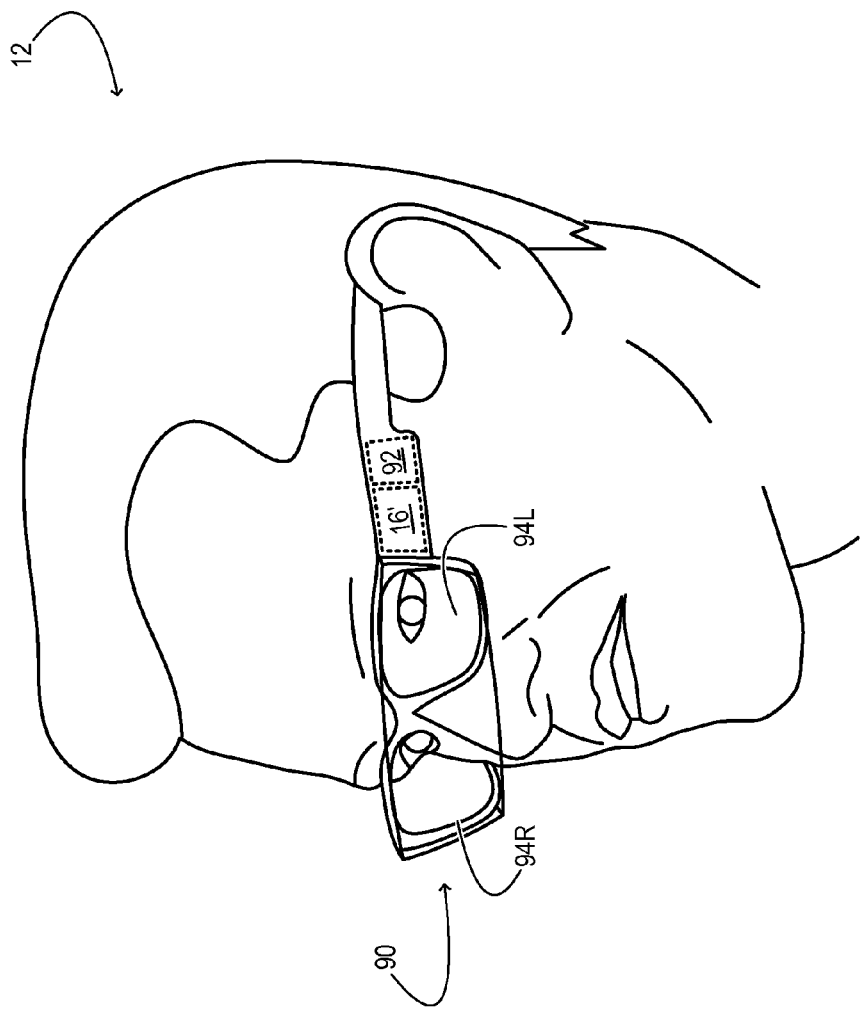
FIG. 12 shows an example wearable electronic device configured to support object targeting based on combined eye tracking and gesture recognition.
Figure 13:
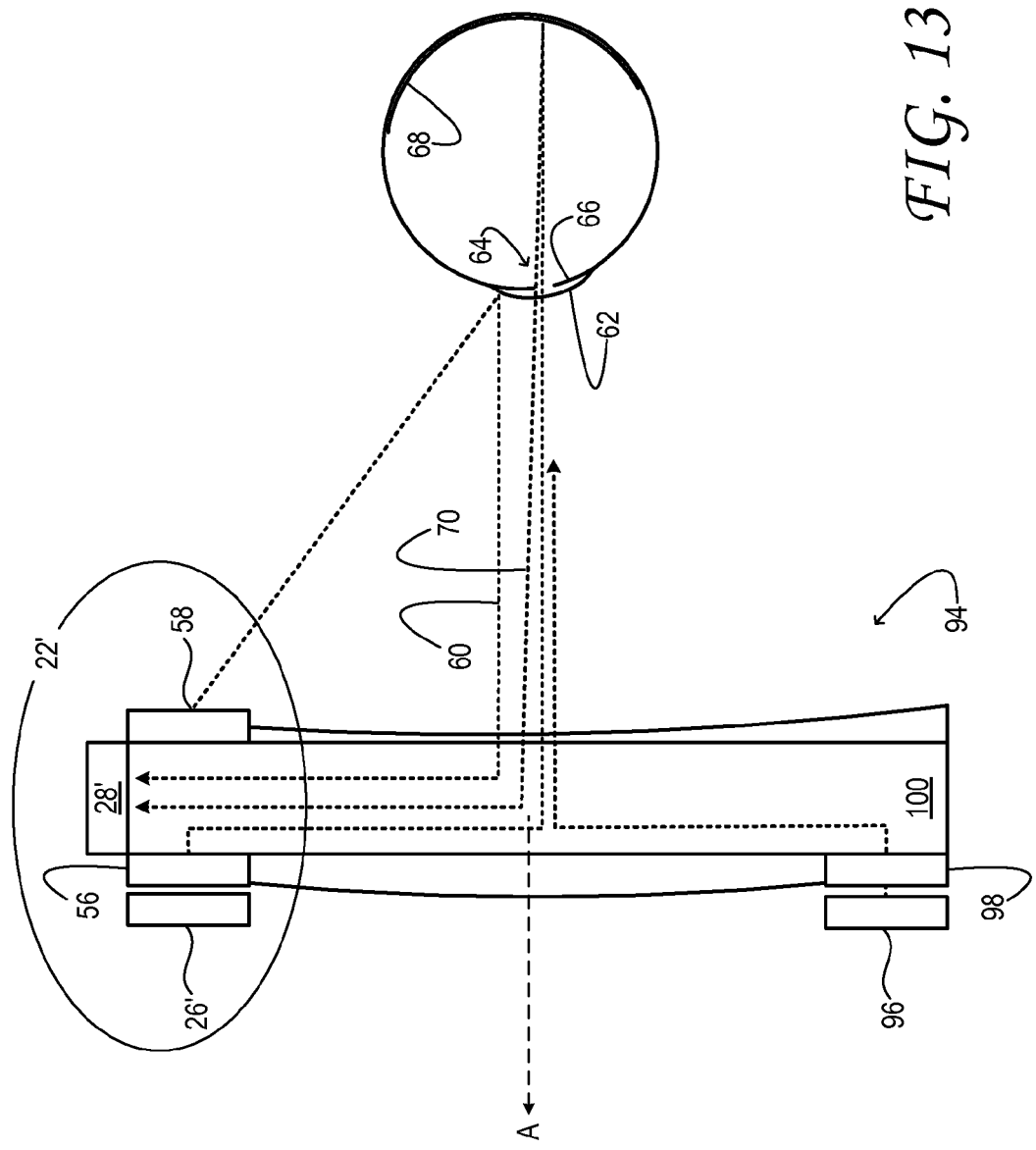
FIG. 13 shows additional aspects of the wearable electronic device of FIG. 12.

FIGS. 12 and 13 show aspects of another embodiment, in which a machine vision system and display are arranged in a wearable electronic device 90. The illustrated device includes stereoscopic, see-through display componentry positioned close to the wearer's eyes; it may be used in augmented-reality (AR) applications, where real-world imagery is admixed with virtual display imagery.

Wearable electronic device 90 includes inertial measurement unit (IMU) 92, comprising a suite of motion sensors. Such sensors may include an accelerometer, gyroscope, and magnetometer. The accelerometer and gyroscope may furnish inertial data along three orthogonal axes as well as rotational data about the three axes, for a combined six degrees of freedom. Data from the accelerometer and gyroscope may be combined with geomagnetic data from the magnetometer to further define the inertial and rotational data in terms of geographic orientation.

Wearable electronic device 90 of FIG. 12 includes separate right and left display panels, 94R and 94L. Compute system 16' is operatively coupled to the display panels and to other display-system componentry. FIG. 13 shows aspects of right or left display panel 94 (94R, 94L) in one, non-limiting embodiment. The display panel includes a backlight 96 and a liquid-crystal display (LCD) matrix 98. The backlight may include an ensemble of LEDs—e.g., white LEDs or a distribution of red, green, and blue LEDs. The backlight may be situated to direct its emission through the LCD matrix, which forms a display image based on control signals from the compute system. The LCD matrix may include numerous, individually addressable pixels arranged on a rectangular grid or other geometry. In some embodiments, pixels transmitting red light may be juxtaposed in the matrix to pixels transmitting green and blue light, so that the LCD matrix forms a color image. In other embodiments, a reflective liquid-crystal-on-silicon (LCOS) matrix or a digital micromirror array may be used in lieu of the LCD matrix of FIG. 13. Alternatively, an active LED matrix or suitable scanned-beam technology may be used to form right and left display images. Although the drawings show separate right and left display panels, a single display panel extending over both eyes may be used instead.

Wearable electronic device 90 includes a machine-machine vision system 22', also operatively coupled to compute system 16'. In the illustrated embodiment, the machine vision system includes an eye-imaging camera 28', an on-axis lamp 56 and an off-axis lamp 58. Beam-turning optics 100 of display panel 94 enable the eye-imaging camera and the on-axis lamp to share a common optical axis A, despite their arrangement on the periphery of the display panel. Machine-machine vision system 22' also includes a front-facing depth camera 26' configured to image at least a portion of the wearer's field of view, including pointer 80. Digital image data from eye-imaging camera 28' and front-facing depth camera 26' may be conveyed to associated logic in compute system 16' or in a remote computer system accessible via a network.

The embodiments of FIGS. 1 and 12 each provide particular benefits. For instance, the stationary machine-vision approach of FIG. 1 does not require the user to put on special headwear or eyewear. It images the user's head and pointer in the same field of view, ensuring that head and pointer images are accurately registered to each other. Moreover, the registration of external objects is easier in this embodiment because the machine vision system has a stationary field of view. The embodiment of FIG. 12, by contrast, is well-suited to virtual- or augmented reality display systems. Here, the machine vision system includes separate front and rear-facing cameras; the front-facing depth camera automatically tracks the user's field of view, while the rear-facing camera is ideally situated to observe the pupils. Nevertheless, some of the benefits of head-mounted embodiments may be offset by errors in co-registering image data from the front and rear cameras, especially when the rig is flexible or movable upon the user's face. Although machine-machine vision system 22' is apt to move as the wearer moves or turns his head, registration of external objects is made possible through self-tracking of wearable electronic device 90 in six degrees of freedom, via IMU 92.

While the structural aspects of this disclosure are described by way of example configurations, this disclosure also encompasses every useful subcombination of the component parts of the example configurations. For instance, some machine vision systems consistent with this disclosure may include an eye-tracking camera arranged in a wearable electronic device, and an external depth camera for gesture recognition. In another example, an external camera may be used in lieu of IMU 92 to establish the location and orientation of wearable electronic device 90 in environment 10. Other useful subcombinations will be readily apparent to one skilled in the art, from reading this disclosure.

Figure 14:
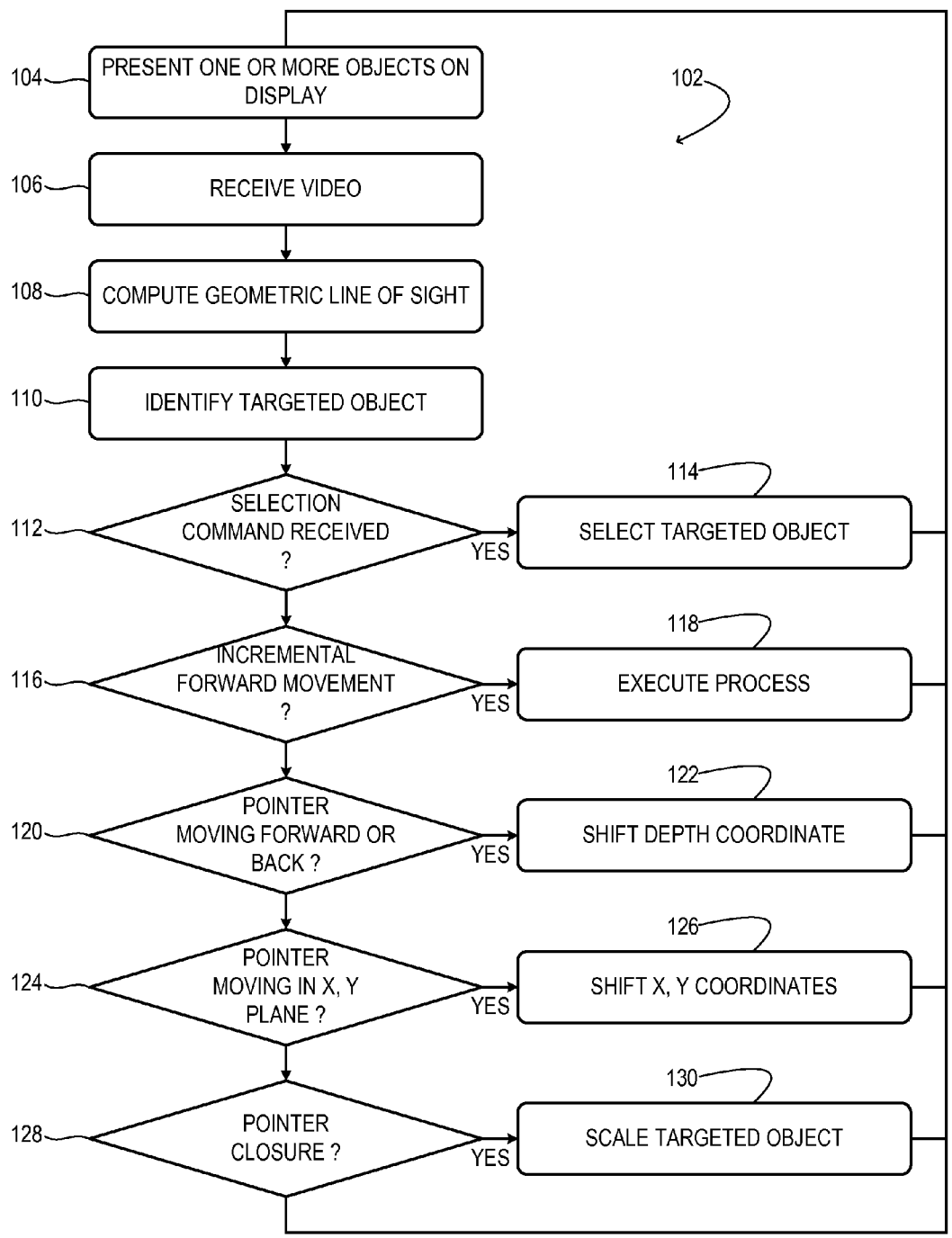
FIG. 14 illustrates an example method to identify a targeted object based on combined eye tracking and gesture recognition.

FIG. 14 illustrates an example method 102 to be enacted in a compute system operatively coupled to a machine vision system. The method identifies a targeted object based on combined eye tracking and gesture recognition.

At 104 of method 102, one or more objects are presented on a display operatively coupled to the compute system. In one embodiment, position data may be accumulated for each of the objects presented on the display. The position data may include offsets of each object relative to a corner of the display, in addition to registration data for the display itself, as described hereinabove. In this manner, spatial coordinates may be assigned to each of the one or more objects presented, the spatial coordinates defining a position of each object within a field of view of the machine vision system.

At 106, video imaging a head and pointer of the user is received from the machine vision system. The video may include a series of time-resolved depth images from a depth camera and/or a series of time-resolved images from a flat-image camera. As noted hereinabove, the pointer may include a finger or hand of the user, a plurality of fingers moved in tandem, or a stylus, for example. In one embodiment, the video may image the head and pointer in the same field of view—i.e., along the same optical axis, from the same vantage point, or through the same camera aperture.

At 108 is computed, based on the video, a geometric line of sight of the user, which is partly occluded by the pointer. In one embodiment, the act of computing the geometric line of sight includes computing spatial coordinates of the head from the video—e.g., from skeletal tracking. In another embodiment, computing the geometric line of sight may include computing spatial coordinates of an eye or pupil of the user from the video. Here, image data from a flat-image camera of the machine vision system may be used. Computed coordinates may include coordinates of one or both eyes, one or both pupils, etc. In these and other embodiments, computing the geometric line of sight may include computing spatial coordinates of the pointer from the video. As described hereinabove, the geometric line of sight may be a straight line L passing through a terminus of the pointer and through coordinates of the head, eye, or pupil of the user.

At 110, with reference to position data for the one or more objects, a targeted object situated along the geometric line of sight is identified. The act of identifying the targeted object may include determining whether the targeted object is situated along or near the geometric line of sight.

At 112 any available form of input to the compute system—voice input, gesture input, etc.—is processed to determine whether the user has signaled selection of the targeted object by way of a selection command. If a selection command has been received, then at 114, the targeted object is selected. In some embodiments, the appearance of the targeted object may be altered upon selection, as a form of visual feedback to the user. The object may be highlighted, brightened, recolored, outlined, made to blink, etc.

At 116 the video is processed to identify an incremental forward movement of the pointer—e.g., a pushing movement of the user's hand—along the geometric line of sight. If the incremental forward movement is detected, then at 118, a process associated with the targeted object is executed. The process here executed may be an activation process for the object.

At 120 the video is processed to identify movement of the pointer toward or away from the user's face, along the line of sight. If such movement is detected, then at 122, the depth coordinate of the targeted object is shifted. In particular, the depth coordinate may be increased for movement of the pointer away from the user's face and decreased for movement of the pointer towards the user's face. In some embodiments, shifting the depth coordinate of an object may move the object from one depth layer of the display to another.

At 124 the video is processed to identify movement of the pointer in a plane substantially parallel to the display, or substantially normal to the line of sight. If such movement is detected, then at 126, the X, Y coordinates of the targeted object are shifted. In this manner, the object may be shifted up, down, left, and/or right on the display. In some embodiments, this action may move the object off of one display and onto another, as described hereinabove.

At 128 the video is processed to identify partial opening or closure of the hand, with the hand remaining in the line of sight. If this gesture is detected, then at 130, the targeted object is scaled—i.e., enlarged or reduced in size commensurate with the extent of partial opening or closure of the hand, with the hand maintained in the line of sight.

Figure 15:
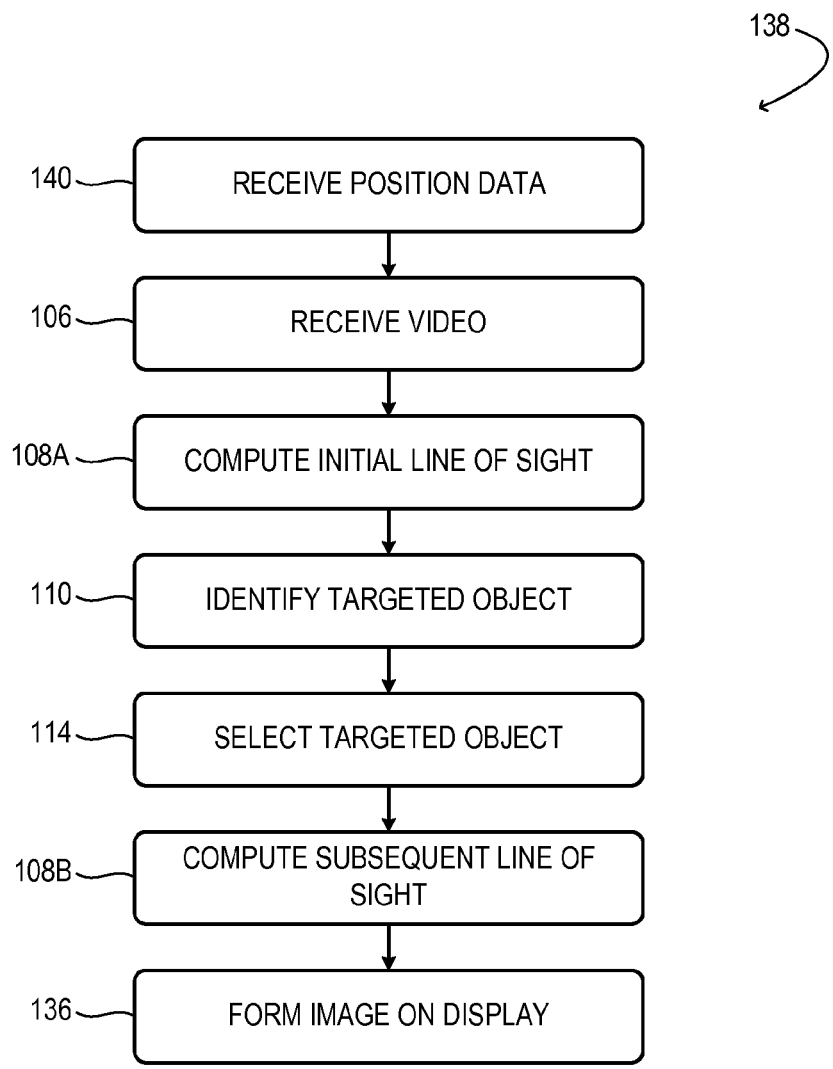
FIG. 15 illustrates an example method to form an object on a display screen based on combined eye tracking and gesture recognition.

FIG. 15 illustrates an example method 138 to be enacted in compute system operatively coupled to a machine vision system and to a display. This method uses eye tracking and gesture recognition to identify a targeted object, and then forms an image representing the object on the display.

At 140 of method 138, position data for the one or more objects is received. The source of the position data may be local to the compute system, in cases where the targeted object is a virtual display object presented for display by the compute system, or a real object registered in the compute system. In other embodiments, the position data may be received from another, communicatively coupled compute system.

At 106, video imaging a head and pointer of the user is received from the machine vision system. At 108A is computed, based on the video, an initial line of sight of the user, which is partly occluded by the pointer. At 110, with reference to position data for the one or more objects, a targeted object situated along the initial line of sight is identified. The targeted object may be a virtual display object of the compute system executing method 138, a real object registered to the compute system, or a virtual display object of another compute system. At 114 the targeted object is selected in response to a selection command from the user-a selection gesture, spoken command, etc. At 108B is computed, based on the video, a subsequent line of sight of the user, which is partly occluded by the pointer. Then, at 136, an image is formed on the display, along the subsequent line of sight, to represent the targeted object.

As evident from the foregoing description, the methods and processes described herein may be tied to a compute system of one or more computing machines. Such methods and processes may be implemented as a computer-application program or service, an application-programming interface (API), a library, and/or other computer-program product. The reader is again referred to FIG. 2, which shows in simplified form a non-limiting example of a compute system 16 to enact the methods and processes described herein. The compute system includes a logic machine 138 and a data-storage machine 140. The computer system also includes a display 14, communication machine 142, and various components not shown the drawing.

Logic machine 138 includes one or more physical logic devices configured to execute instructions. A logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

Logic machine 138 may include one or more processors configured to execute software instructions. Additionally or alternatively, a logic machine may include one or more hardware or firmware logic machines configured to execute hardware or firmware instructions. Processors of a logic machine may be single-core or multi-core, and the instructions executed thereon may be configured for sequential, parallel, and/or distributed processing. Individual components of a logic machine optionally may be distributed among two or more separate devices, which may be remotely located and/or configured for coordinated processing. Aspects of a logic machine may be virtualized and executed by remotely accessible, networked computing devices configured in a cloud-computing configuration.

Data-storage machine 140 includes one or more physical, computer-memory devices configured to hold instructions executable by an associated logic machine 138 to implement the methods and processes described herein. When such methods and processes are implemented, the state of the data-storage machine may be transformed—e.g., to hold different data. A data-storage machine may include removable and/or built-in devices; it may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. A data-storage machine may include volatile, nonvolatile, dynamic, static, read/write, read-only, random-access, sequential-access, location-addressable, file-addressable, and/or content-addressable devices.

It will be appreciated that data-storage machine 140 includes one or more physical devices. However, aspects of the instructions described herein alternatively may be propagated by a communication medium (e.g., an electromagnetic signal, an optical signal, etc.), as opposed to being stored via a storage medium.

Aspects of logic machine 138 and data-storage machine 140 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms 'module', 'program', and 'engine' may be used to describe an aspect of a computer system implemented to perform a particular function. In some cases, a module, program, or engine may be instantiated via a logic machine executing instructions held by a data-storage machine. It will be understood that different modules, programs, and engines may be instantiated from the same application, service, code block, object, library, routine, API, function, etc. Likewise, the same module, program, or engine may be instantiated by different applications, services, code blocks, objects, routines, APIs, functions, etc. A module, program, or engine may encompass individual or groups of executable files, data files, libraries, drivers, scripts, database records, etc.

Display 14 may be used to present a visual representation of data held by data-storage machine 140. This visual representation may take the form of a graphical user interface (GUI). As the herein described methods and processes change the data held by the data-storage machine, and thus transform the state of the data-storage machine, the state of display 14 may likewise be transformed to visually represent changes in the underlying data. Display 14 may include one or more display devices utilizing virtually any type of technology. Such display devices may be combined with logic machine 138 and/or data-storage machine 140 in a shared enclosure, or such display devices may be peripheral display devices.

Communication machine 142 may be configured to communicatively couple the compute system to one or more other machines, including server computer systems. The communication machine may include wired and/or wireless communication devices compatible with one or more different communication protocols. As non-limiting examples, a communication machine may be configured for communication via a wireless telephone network, or a wired or wireless local- or wide-area network. In some examples, a communication machine may allow a computing machine to send and/or receive messages to and/or from other devices via a network such as the Internet.

It will be understood that the configurations and/or approaches described herein are exemplary in nature, and that these specific examples or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

One aspect of this disclosure is a method enacted in a compute system operatively coupled to a machine vision system. The method comprises acts of: receiving, from the machine vision system, video imaging a head and pointer of a user in the same field of view; computing, based on the video, a geometric line of sight of the user partly occluded by the pointer; identifying, with reference to position data for one or more objects, a targeted object situated along the geometric line of sight; processing the video to identify an incremental forward movement of the pointer along the geometric line of sight; and executing a process associated with the targeted object in response to the incremental forward movement.

In some implementations, the above method includes presenting the one or more objects on a display operatively coupled to the compute system. In these and other implementations, computing the geometric line of sight may include computing spatial coordinates of the head from the video and/or computing the geometric line of sight may include computing spatial coordinates of an eye or pupil of the user from the video and/or computing spatial coordinates of the pointer from the video. In these and other implementations, the geometric line of sight may be a straight line passing through the pointer and through the eye of the user.

In some implementations, identifying the targeted object in the above method includes determining whether the targeted object is situated along the geometric line of sight. In these and other implementations, the pointer may include a finger of the user; the machine vision system may include a depth camera, and the video may include a series of time-resolved depth images from the depth camera. Further, the machine vision system may include a flat-image camera, and the video may include a series of time-resolved images from the flat-image camera.

In some implementations, depth and flat-image cameras of the machine vision system may have parallel optical axes oriented in the same direction. The above method may also include representing the targeted object visually as a selected object in response to a selection command spoken by the user and/or accumulating the position data by assigning spatial coordinates to each of the one or more objects, wherein the spatial coordinates define a position of each object within a field of view of the machine vision system.

In some implementations, assembling the position data may include receiving user input defining the spatial coordinates. In these and other implementations, the targeted object may be a virtual display object presented on a display operatively coupled to the compute system; accumulating the position data may include receiving user input defining spatial coordinates of a viewing area of the display. In these and other implementations, accumulating the position data may include acts of: receiving, from the machine vision system, prior video imaging a head and pointer of the user in the same field of view; computing, based on the video, a prior line of sight of the user partly occluded by the pointer; and storing spatial coordinates that lie along the prior line of sight.

Another aspect of this disclosure provides a compute system comprising a logic machine and a data-storage machine; the data-storage machine stores instructions executable by the logic machine to: receive from the machine vision system, via a hardware interface, video imaging a head and pointer of the user; compute, based on the video, an initial line of sight of the user partly occluded by the pointer; identify, with reference to position data for one or more registered objects, a targeted object situated along the initial line of sight; compute, based on the video, a subsequent line of sight of the user partly occluded by the pointer; and form on the display, along the subsequent line of sight, an image to represent the targeted object.

In some implementations, the instructions above are further executable to select the identified targeted object in response to a selection command from the user. The instructions may be further executable to receive the position data for the one or more objects from another compute system. In these and other implementations, the machine vision system and/or display may be integrated in a head-mounted device wearable by the user.

Another aspect of this disclosure provides a method enacted in a compute system operatively coupled to a machine vision system and to a display. The method comprises acts of: receiving, from the machine vision system, video imaging a head and hand of the user; computing, based on the video, an initial line of sight of the user partly occluded by the hand; identifying, with reference to position data for one or more objects, a targeted object situated along the initial line of sight; processing the video to identify movement of the hand away from the user, along the line of sight; shifting a depth coordinate of the image in response to movement of the hand away from the user, along the line of sight; processing the video to identify closure of the hand, with the hand remaining in the line of sight; and reducing the size of the image in response to closure of the hand, with the hand maintained in the line of sight.

The invention claimed is:

1. In a compute system operatively coupled to a machine vision system and to a display, a method comprising:
   receiving, from the machine vision system, prior and subsequent video imaging a head and pointer of a user;
   computing, based on the prior video, a prior geometric line of sight of the user partly occluded by the pointer;
   assigning spatial coordinates to one or more non-display objects situated along the prior geometric line of sight, the spatial coordinates defining a position of each of the non-display objects within a field of view of the machine vision system;
   computing, based on the subsequent video, a subsequent geometric line of sight of the user partly occluded by the pointer;
   identifying, by reference to the spatial coordinates of the one or more non-display objects, a targeted display object situated on the display and along the subsequent geometric line of sight;
   identifying in the subsequent video movement of the pointer along the subsequent geometric line of sight;
   and executing code for a process associated with the targeted display object in response to the movement.

2. The method of claim 1, further comprising presenting the targeted display object on the display.

3. The method of claim 1, wherein computing the subsequent geometric line of sight includes computing spatial coordinates of the head from the subsequent video.

4. The method of claim 1, wherein computing the subsequent geometric line of sight includes computing spatial coordinates of an eye or pupil of the user from the subsequent video.

5. The method of claim 1, wherein computing the subsequent geometric line of sight includes
   computing spatial coordinates of the pointer from the subsequent video,
   and wherein the subsequent geometric line of sight is a straight line passing through the pointer and through the eye of the user.

6. The method of claim 1, wherein identifying the targeted display object includes determining whether the targeted display object is situated along the subsequent geometric line of sight.

7. The method of claim 1, wherein the pointer includes a finger of the user.

8. The method of claim 1, wherein the machine vision system includes a depth camera, and wherein each of the prior and subsequent video includes a series of time-resolved depth images from the depth camera.

9. The method of claim 1, wherein the machine vision system includes a flat-image camera, and wherein each of the prior and subsequent video includes a series of time-resolved images from the flat-image camera.

10. The method of claim 1, wherein depth and flat-image cameras of the machine vision system have parallel optical axes oriented in the same direction.

11. The method of claim 1, further comprising representing the targeted display object visually as a selected object in response to a selection command spoken by the user.

12. The method of claim 1, further comprising receiving user input defining the spatial coordinates.

13. The method of claim 1, wherein the one or more non-display objects define a viewing area of the display.

14. The method of claim 1, further comprising:
receiving, from the machine vision system, final video imaging the head and pointer of the user;
computing, based on the final video, a final line of sight of the user partly occluded by the pointer; and
forming on the display, along the final line of sight, an image to represent the targeted display object.

15. The method of claim 1, wherein the code is further executable to select the targeted display object in response to a selection command from the user.

16. The method of claim 1, wherein the machine vision system and the display are integrated in a head-mounted device worn by the user.

17. In a compute system operatively coupled to a machine vision system and to a display, a method comprising:
receiving, from the machine vision system, video imaging a head and hand of a user;
computing, based on the video, a geometric line of sight of the user partly occluded by the hand;
identifying, with reference to position data for one or more objects, a targeted display object situated on the display and along the geometric line of sight;
identifying, in the video, movement of the hand away from the user, along the geometric line of sight;
and shifting a depth coordinate of the display object in response to movement of the hand away from the user, along the geometric line of sight.

18. The method of claim 17 further comprising:
processing the video to identify closure of the hand, with the hand remaining in the geometric line of sight; and
reducing the size of the display object in response to closure of the hand, with the hand maintained in the geometric line of sight.

19. In a compute system operatively coupled to a machine vision system, a method comprising:
associating a process of the compute system to a non-display object arranged in a field of view of the machine-vision system, the process being one of a plurality of processes associated with a corresponding plurality of non-display objects in the field of view of the machine-vision system;
receiving, from the machine vision system, video imaging a head and pointer of a user;
computing, based on the video, a geometric line of sight of the user partly occluded by the pointer;
identifying the non-display object by reference to position data defining spatial coordinates of the plurality of non-display objects, the non-display object being situated along the geometric line of sight;
identifying in the video movement of the pointer along the geometric line of sight;
and executing the process associated with the targeted non-display object in response to the movement.

20. The method of claim 19, wherein the machine vision system is integrated into a head-mounted display device worn by the user.

* * * * *